Oct. 3, 1967     H. E. TELGHEIDER     3,344,493
SPREADER ROLL
Filed Feb. 19, 1965     8 Sheets-Sheet 1

INVENTOR:
HENRY E. TELGHEIDER
BY
Howson & Howson
ATTYS.

FIG. 6.

INVENTOR:
HENRY E. TELGHEIDER

Oct. 3, 1967  H. E. TELGHEIDER  3,344,493
SPREADER ROLL

Filed Feb. 19, 1965  8 Sheets-Sheet 5

INVENTOR:
HENRY E. TELGHEIDER
BY

ATTYS.

Oct. 3, 1967 H. E. TELGHEIDER 3,344,493
SPREADER ROLL
Filed Feb. 19, 1965 8 Sheets-Sheet 6

INVENTOR:
HENRY E. TELGHEIDER
BY
Howson & Howson
ATTYS.

Oct. 3, 1967  H. E. TELGHEIDER  3,344,493
SPREADER ROLL
Filed Feb. 19, 1965  8 Sheets-Sheet 8

INVENTOR:
HENRY E. TELGHEIDER
BY
Howson & Howson
ATTYS.

United States Patent Office 3,344,493
Patented Oct. 3, 1967

3,344,493
SPREADER ROLL
Henry E. Telgheider, 291 Avon Road,
Springfield, Pa. 19064
Filed Feb. 19, 1965, Ser. No. 433,947
9 Claims. (Cl. 26—63)

This application is a continuation-in-part of application Ser. No. 210,925, filed July 19, 1962, and now abandoned.

This invention relates to spreader rolls and to new and improved devices of this general class.

It is known to provide a rotating roll that will exert a spreading or contracting action upon a travelling web of paper, textile or plastic material while such a web is passing through processing machinery. A spreading action at regular intervals or at certain locations within the processing machinery is necessary to straighten or smooth-out wrinkles or folds in the web that run longitudinally in the direction of travel, and which are caused by various forces acting upon the web while it is being processed.

In addition to straightening or smoothing-out wrinkles or folds in the web, the spreading forces exerted by the roll upon the web will improve the physical properties of the web due to uniform realignment of the internal structure or elements of the web material. Such forces generally have a tendency to increase the ultimate tensile strength, the modulus of elasticity, and will make the products less susceptible to atmospheric changes in the direction of the applied spreading forces.

Furthermore, the spreader roll of the present invention where desired will exert a contracting action on such web materials during their manufacture to cause possible shrinking stresses to be eliminated, thereby modifying the physical properties of the end product such as decreasing the ultimate tensile strength, decreasing the modulus of elasticity and increasing the breaking elongation thereby giving a relatively brittle material more toughness or ductility.

A typical spreader roll now in wide use is basically a curved or bowed roll which is covered by a rubber material conforming to the shape of the roll. Such a roll operates on the principle that as the web contacts the roll each portion of the web will move in a direction perpendicular to the particular roll surface over which it is travelling. Thus, the central portion of the web will contact the center of the spreader roll and will continue to move on undisturbed in a longitudinal direction. However, the areas of the web to the left and right of the center will travel perpendicular to the bowed surface of the spreader roll with the result that the roll forces are transmitted to the web at an angle to the longitudinal direction of travel of the web so that the different portions of the web being spread necessarily travel at varying angles with respect to the center-line of the web. Thus, the lateral edges of the web diverge at the largest angle which decreases inwardly toward the center of the web. Hence, if the rolls are used individually, and not in pairs, it is virtually impossible to have the web travel exactly the same length at various points along the width of the spreader roll, and thus, the web will be running slack at certain points while it will be over-stretched at other points. This problem is magnified in closely designed machinery where the free and unsupported length of the web runs are relatively short. Also, such prior rolls are necessarily limited to the extent of stretching action they can exert because of the curved geometry thereof.

It has also been proposed to provide spreader rolls comprising a cylindrical surface having grooves formed therein extending longitudinally the entire length of the roll. Elastic cords are disposed in such slots and attached to plates at each end of the roll. In the operation of such a spreader roll, the elastic cords are individually stretched and relaxed in a cycle as the roll makes a complete revolution, with the web to be stretched contacting a rubber cord as it is being stretched so that the stretching action of the rubber cord will in turn be imparted to the web. Such a spreader roll, however, has several serious drawbacks. First, the surface presented to the web is not cylindrical as the cords protrude outwardly from the surface of the cylindrical metal body and a whipping action is created on the web which becomes more serious as the speed of revolution increases. This can damage and even break the web. Second, the means employed to retain the cords in their respective grooves causes friction between the cords and roll which in operation results in nonuniform stretching in the cords so that maximum stretching of each cord occurs adjacent the ends thereof with very little or no stretching in the inner portion of the cord. In other words, the stretching force on a given cord as modified by the frictional forces will be gradually absorbed long before the central portion of a given cord is reached. Hence, the web will be over-spread adjacent its outer edges and receive little or no spreading action in its central portion.

With the foregoing in mind, it is an object of the present invention to provide a spreader roll which will exert a uniform stretching or spreading action widthwise across the surface of a travelling web.

Another object of the present invention is to provide a spreader roll having an outside or exterior surface which approaches a cylinder.

Another object of the present invention is to provide a spreader roll wherein the centrifugal force of rotation is actually employed to decrease frictional forces and insure a uniform spreading action by the roll on a web.

A further object of the present invention is to provide a spreader roll wherein the spreading action exerted on the web may be adjusted to conform to the needs of a particular situation.

These and other objects of the invention and the features and details of construction and operation therof are hereinafter set forth and described and shown in the accompanying drawings, in which.

A spreader roll according to the present invention comprises generally a rigid cylindrical sleeve rotatably mounted coaxially upon a stationary shaft. Annular members are also rotatably mounted on the shaft respectively outwardly adjacent the opposite ends of the cylindrical sleeve and these member are mounted to rotate respectively about axes angularly disposed with respect to each other and to the shaft. A plurality of independent elastic bar elements of rubber or other suitable material are disposed on the exterior surface of the sleeve and extend longitudinally therealong in closely spaced parallel relation circumferentially thereabout presenting a substantially continuous cylindrical exterior roll surface. Each of the elastic bar elements has its opposite ends securely anchored respectively to the annular members on the shaft so that during each revolution of said members and the sleeve each elastic bar element is caused progressively to be stretched and elongated and then relaxed and contracted. Also, restraining means are provided which engage each of the elastic bar elements and oppose centrifugal forces tending to displace the bar elements outwardly from the sleeve while permitting longitudinal movement of adjacent bar elements relative to one another with a minimum of friction between the sleeve and bar elements during longitudinal elongation and contraction thereof.

In addition, each of the elastic bar elements is preferably provided internally thereof with a spring member extending longitudinally therein and having its opposite ends anchored with the bar elements to the annular members on the shaft. The spring members function to distribute the elongation and contraction of each bar element uniformly along the length thereof so that it is not concentrated in the outer end portions of the bar elements. Thus, while the use of such springs in the elastic bar elements is not absolutely essential in spreader rolls of comparatively short axial length, the use of springs is highly desirable in rolls of longer axial length and in all rolls where the uniform distribution of elongation and contraction along the length of the elastic bar elements is required or desired.

Referring now more particularly to the drawings, a spreader roll 10 embodying the present invention basically comprises a plurality of elongated elastic bar elements 12 disposed in spaced parallel relation circumferentially about the outer surface of a cylindrical sleeve 16 (FIG. 7) and extending longitudinally thereof. The cylindrical sleeve is rotatably mounted on a stationary shaft 20, and, as described in greater detail hereinafter, the bar elements 12 each has its opposite ends secured respectively to an annular carriage 18 which is rotatably mounted on a block 22 fixed on the stationary shaft 20. The pair of carriages 18, to which each bar 12 is anchored, are mounted to rotate respectively about axes angularly disposed to each other and to the shaft 20 so that as rotation occurs, each bar element 12 is progressively stretched and elongated to a maximum when it is in the topmost position of FIGS. 3 and 6 and then is progressively relaxed and contracted to a minimum length in the bottommost position thereof.

Figures 3, 4, 5:
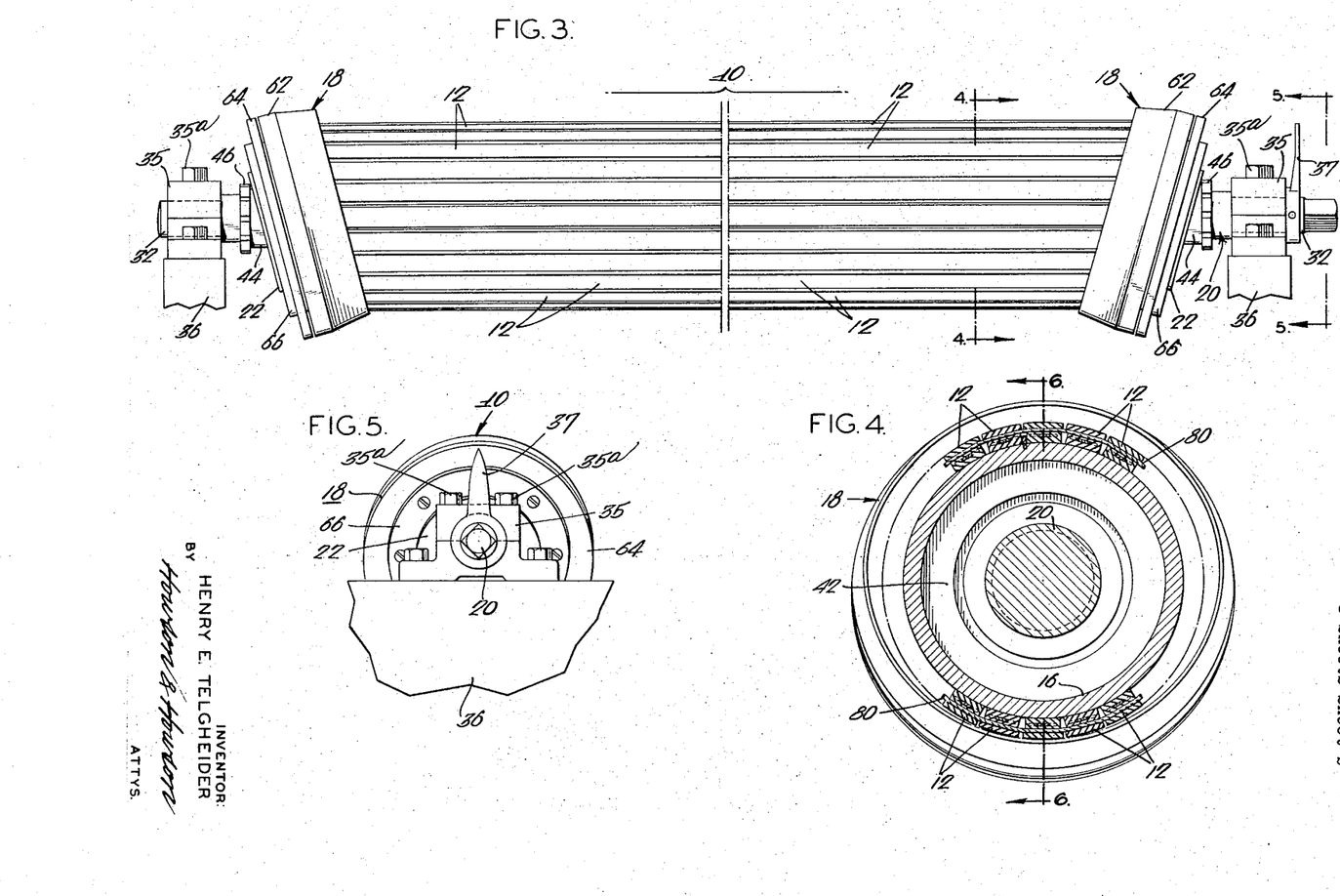
FIG. 3 is a front elevational view of a spreader roll constituting an embodiment of the present invention.
FIG. 4 is an enlarged sectional view taken on line 4—4, FIG. 3.
FIG. 5 is an end elevational view from line 5—5, FIG. 3.
Figure 6:
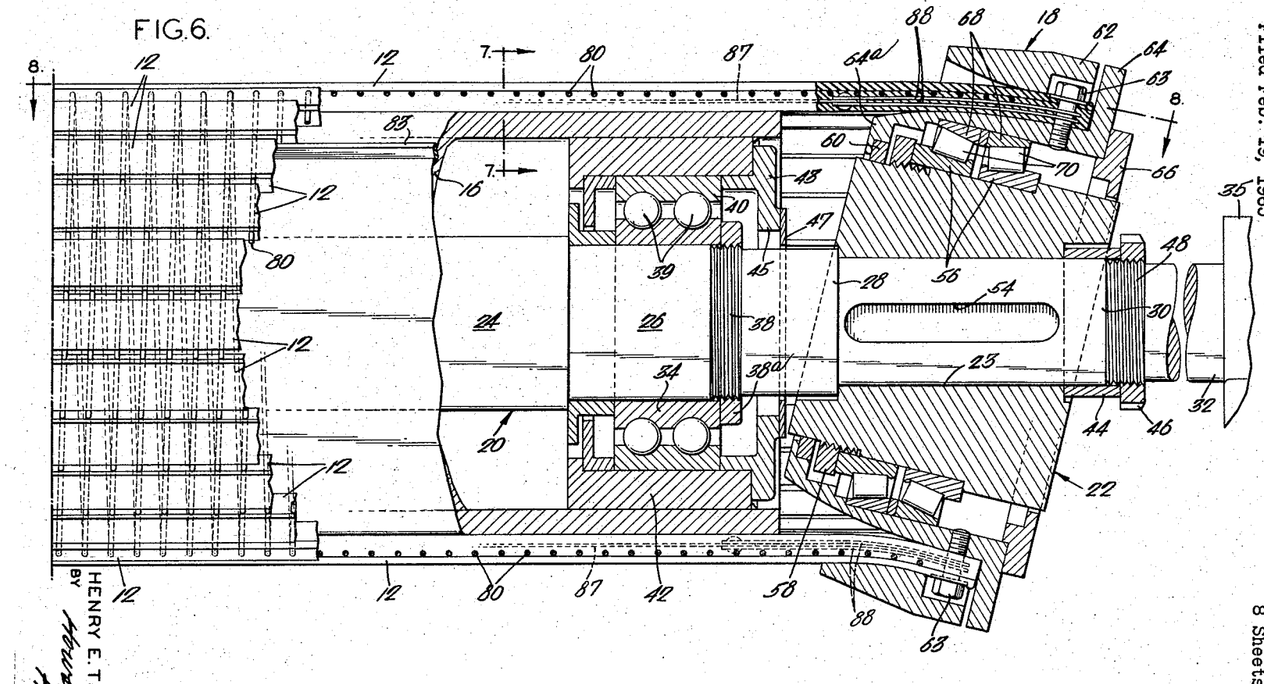
FIG. 6 is an enlarged fragmentary sectional view taken on line 6—6, FIG. 4.

As indicated in FIG. 6 the stationary shaft 20 is composed of a main section 24 having at opposite ends thereof, a first locking section 26, a shoulder section 28, a second locking section 30 and end section or trunnion 32. As indicated in FIG. 3, each end section or trunnion 32 is secured in a clamp 35 mounted on pads 36.

It may be desirable to vary the position of maximum stretch and elongation of the bar elements 12 circumferentially with respect to the clamps 35 and pads 36 in order to advance or retract such maximum position relative to the travelling web according to the particular requirements and conditions of each operation. This adjustment can be accomplished simply by loosening the bolts 35a of clamps 35 and rotating the shaft 20 the required amount in the proper direction to relocate the position of maximum elongation or stretch of the bars 12 in the desired location. To facilitate this adjustment an indicator 37 is fixed on shaft 20 and pointed to indicate the maximum stretch position of the roll 10 as shown in FIG. 5.

As previously stated, the shaft 20 is stationary at all times. Mounted on each section 26 of the shaft 20 is a bearing assembly comprising an inner fixed race 34, ball bearings 39 and a rotatable outer race 40. The bearing assembly is secured in place on shaft section 26 by a lock nut 38a which engages threads 38 on the shoulder section 26. Secured to the outer races 40 of each bearing assembly is a sleeve 42 which is secured interiorly of the cylinder sleeve 16 adjacent each end thereof. Associated with sleeve 42 is an extension or ring 43 having a flange 45 and seal 47.

It is to be noted that the spreader roll of FIG. 6 is in the form of an idler roll and thus the cylinder 16, carriages 18 and the elastic bars 12 will be rotated about the fixed shaft 20 by travel of the web passing thereabout in contact with the elastic bars 12. However, where desired, a driving mechanism may be associated with the cylinder 16 in order to drive the roll with respect to the fixed shaft 20.

As indicated in FIG. 6, the section 26 of the shaft 20 terminates in a shoulder section 28 of slightly smaller diameter which in turn terminates in a second locking section 30 of still smaller diameter. The stationary block 22 has a bore or opening 23 therethrough disposed at an angle to the axis of the block to receive the shaft section 30. Each block 22 is secured on shaft section 30 by means of a collar 44 and a locking nut 46 engaged with threads 48 on the shaft end section 30. By virtue of the angular disposition of the bores 23 in the blocks 22 the latter are mounted at an angle to each other and to the shaft 20 as shown. A key slot 54 is formed in each section 30 of shaft 20 and this slot is engaged by a key (not shown) carried by the stationary block 22 in order to secure the same against rotation relative to said shaft. As also shown in FIG. 6, inner bearing races 56 are secured on the outer cylindrical surface of the stationary block 22 by means of a locking collar 58 threaded on the stationary block 22.

The annular carriages 18 each comprise a ring clamp 62, a collar 64, a front skirt 66 and outer bearing races 68. A bearing ring 60 adjacent the inner end of each stationary block 22 is carried by the inner end flange 64a of the collar 64. Roller bearings 70 are interposed between the outer bearing races 68 and the inner bearing races 56 to provide a rotatable mounting for the annular carriages 18 with respect to the stationary blocks 22. The opposite ends of each elastic bar element 12 are securely anchored to the annular carriages 18 by means of bolts 63 and the ring clamps 62.

Figure 1:
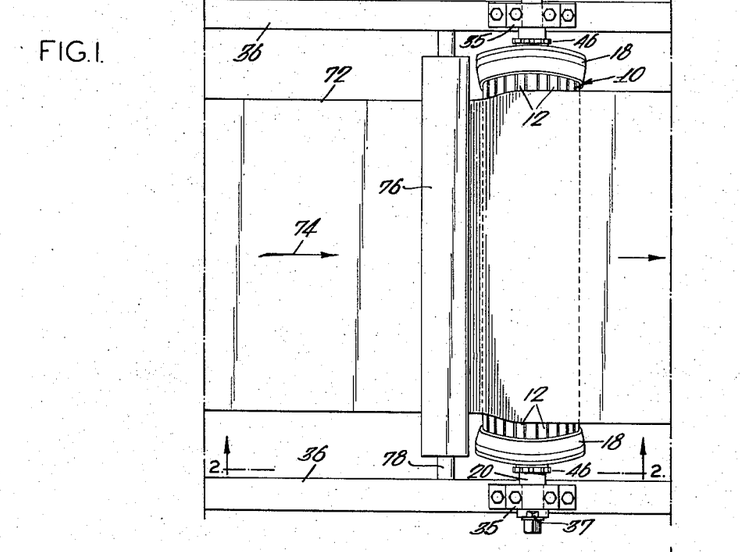
FIG. 1 is a diagrammatic top plan view showing a spreader roll embodying the present invention in combination with another roll and with a web passing therebetween.
Figure 2:
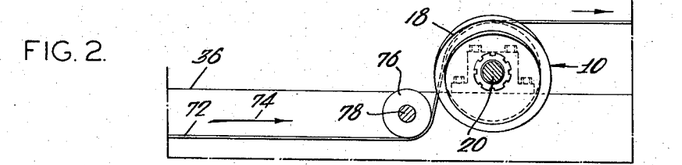
FIG. 2 is a side elevational view of the assembly of FIG. 1.

Each of the elastic bars 12 is independently progressively stretched and contracted as the annular carriages 18 rotate about the stationary blocks 22. Hence, as shown in FIG. 1, when a web of material 72 is travelling in the direction of arrows 74 under idler roll 76 and then about the spreader roll 10, a spreading action will be exerted upon the web 72 by the elastic bars 12 as they are stretched and elongated. As further illustrated in FIGS. 1 and 2, the idler roll 76 revolves on a stationary shaft 78 mounted in suitable supports.

In accordance with the present invention, suitable means is provided to retain the several elastic bars 12 against displacement from the sleeve 16 by centrifugal force, while at the same time providing a minimum of frictional contact between the sleeve and bars 12 so that the latter may independently elongate and contract relative to one another and the sleeve 16 substantially free of frictional resistance. In the embodiment of the invention shown in FIGS. 4–10 of the drawings, the retaining means is in the form of a cable or cord 80 of suitable material and tensile strength, for example, nylon or Dacron, or wire. As best shown in FIG. 6, the cord 80 is spirally wound about the spreader roll and engages each of the elastic bars 12.

Figure 7:
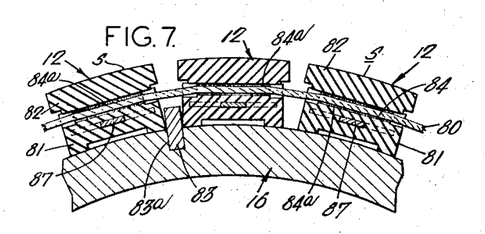
FIG. 7 is a fragmentary enlarged sectional view taken on line 7—7, FIG. 6.
Figures 9, 11:
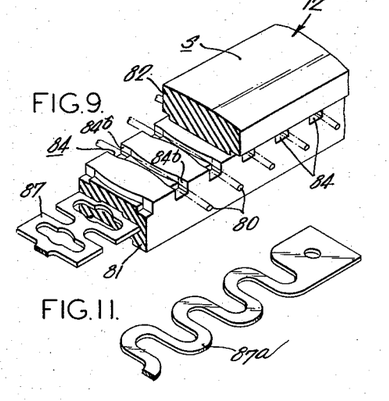
FIG. 9 is a fragmentary sectional view in perspective showing the details of construction of one form of elastic bar element.
FIG. 11 is a fragmentary view in perspective showing an alternate structural form of spring member which may be incorporated in the elastic bar elements.

In the embodiment of the invention shown in FIGS. 7 and 9 of the drawings, each of the elastic bar elements 12 comprises a base portion 81 and an outer cap portion 82. The base and cap portions 81 and 82 of the elastic bars may be made of natural or synthetic rubber or other material capable of being alternately progressively stretched and elongated and then progressively relaxed and contracted to the normal position during each revolution of the spreader roll 10.

The required number of elastic bars 12 are disposed in closely spaced parallel relation circumferentially about the sleeve 16 and extend longitudinally along the exterior surface thereof. A longitudinally extending key 83 engaging a groove 83a in the surface of the sleeve 16 is provided between any two adjacent bar elements 12 on the roll 10 to prevent the bar elements 12 from creeping circumferentially on the sleeve 16 and thereby maintain the bar elements in the desired position circumferentially on the sleeve surface. The retaining cord 80 is received within slots 84 formed transversely in the outer face of the base portion 81, as more clearly shown in FIG. 9, and the cord 80 is bonded or anchored as indicated at 84a in FIGS. 7 and 10 to the base portion 81 at the mid-portion of the slots 84 to prevent slippage or creeping of the cord and bar elements 12 circumferentially relative to one another. The opposite end portions of the slots 84 are wider in the longitudinal direction as indicated at 84b to afford freedom of the adjacent portions of the cord 80 as the bar elements are independently elongated and contracted during rotation of the roll. The outer cap portion 82 is permanently secured upon and bonded to the outer face of the base portion 81 by means of a suitable adhesive, vulcanization, or otherwise, and bonding or anchoring of the cord 80 in the slots 84 as previously described may be accomplished by the same means and at the same time that the cap portion 82 is bonded to the base portion 81.

In assembling the elastic bar elements 12 on the sleeve 16, the base portions 81 may be first suitably positioned on the outer surface of the sleeve 16 and secured in place by means of the cord 80. The outer cap portions 82 may then be secured to the respective base portions 81 after which the outer faces s of the cap portions 82 may be ground or machined to a curvature providing a true cylindrical surface on the exterior of the roll 10, as shown in FIG. 7, and the close spacing of the adjacent bar elements 12 in effect provides a cylindrical outer surface on the roll 10 which is substantially continuous.

Figure 10:
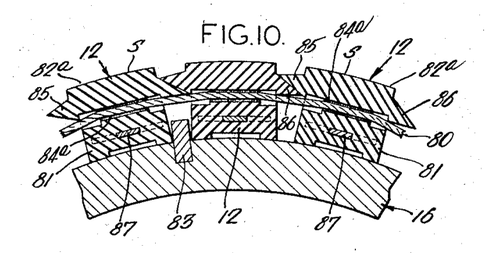
FIG. 10 is a fragmentary sectional view similar to FIG. 7 showing another structural embodiment of elastic bar elements.

A modified construction of the elastic bar elements 12 is shown in FIG. 10 of the drawings wherein the outer cap portions 82a thereof are provided with projecting beveled or feathered edge portions 85 and 86, respectively, extending continuously along the opposite sides thereof and arranged and configurated for cooperative and overlapping engagement with corresponding projection portions 85 and 86 on the adjacent bar elements 12 on the roll. These overlapping edge portions 85 and 86 effectively enclose the retaining member 80 and prevent particles from the web, dirt and other foreign material from collecting in the spaces between the adjacent bar elements 12.

Figure 8:
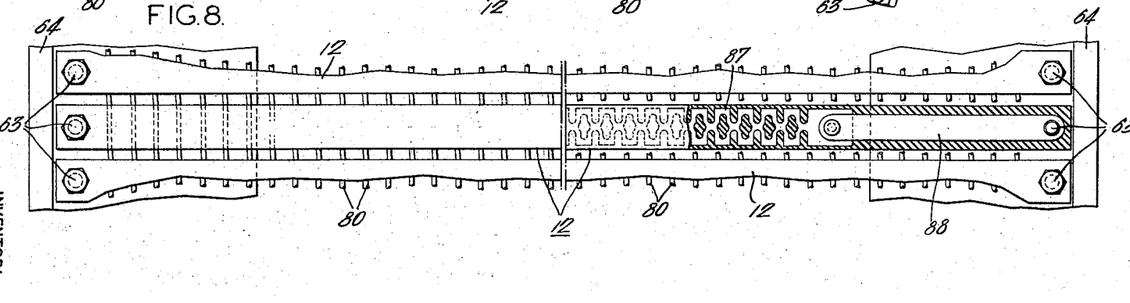
FIG. 8 is a fragmentary plan view, partially in section of an elastic bar element showing certain details of the construction and arrangement thereof.

As previously stated, each of the bar elements preferably has embedded therein a longitudinally extending spring member which functions primarily to distribute the elongation and contraction of each bar element uniformly therealong so that it is not concentrated solely in the outer end portions of the bar elements. Thus as shown in FIGS. 7 and 10 of the drawings, a spring 87 is embedded in the base portion 81 of the bar element 12 and extends longitudinally therein substantially to the opposite ends of the bar element. The spring members 87 are fabricated of suitable spring steel stock and, as shown in FIG. 8 of the drawings, the opposite ends of each spring 87 are connected respectively to the inner ends of steel strap members 88, the outer ends of which are apertured to receive therethrough the bolts 63. Thus the spring 87 in each bar element 12 has its opposite ends securely anchored to the annular carriages 18 together with the base and cap portions 81 and 82 thereof. FIGS. 8 and 9 of the drawings show one form of spring 87 which has been found satisfactory for use in spreader rolls 10 designed for comparatively heavy duty operation, and FIG. 11 shows an alternate form of spring 87a which has been found to be satisfactory for use in spreader rolls designed for comparatively lighter duty operation.

In addition to distributing elongation and contraction of the bar elements 12 uniformly along their length, the springs 87 and 87a also impart rigidity to the bar elements and sufficient stiffness at the inner portions of the bars essential for higher running speeds of modern machinery to shift the natural vibration frequencies in the longitudinal direction of the elastic elements 12 safely above operating frequencies, and in most instances each elastic bar element 12 should have a minimum stiffness calculated as spring-constant stiffness.

As previously stated, in operation of the roll the retaining cord 80 opposes outward displacement of the bar elements 12 from the surface of the sleeve 16, but nevertheless the centrifugal force generated by rotation of the roll tends to urge the bars 12 away from the sleeve surface and thus actually operates to minimize friction between the sleeve 16 and bar elements 12 as the latter elongate and contract with rotation of the roll. In the present invention, the bars 12 substantially float upon the outer surface of the sleeve 16 and thus the frictional forces between the rubber bars 12 and the steel cylinder 16 are reduced to a minimum so that the bars 12 independently elongate and contract relative to one another and the sleeve 16 with substantial freedom.

Figure 12:
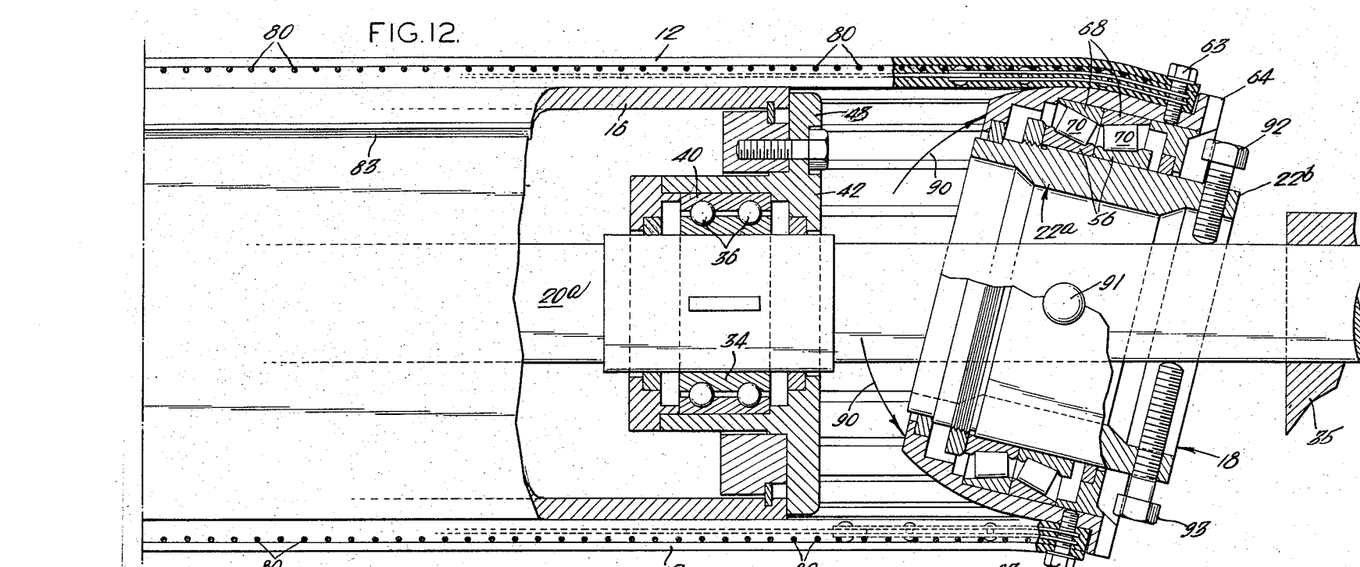
FIG. 12 is a fragmentary sectional view similar to FIG. 6 showing an adjustable form of mounting for the annular bar supporting members of a spreader roll.

Another embodiment of the invention is illustrated in FIG. 12 of the drawings wherein provision is made for adjusting the angular position of the blocks 22a to thereby increase or decrease the degree of elongation and contraction of the bar elements 12. Thus, the angular position of the stationary block 22a on the shaft 20a may be adjusted as indicated by the arrows 90 about the pivot 91 by means of set screws 92 and 93 mounted in the stationary block 22a and bearing against the stationary shaft 20a. It therefore follows that as the stationary block 22a is tilted with respect to the shaft 20a, or in other words as the angle of the stationary block 22a is increased or decreased relative to the axis of the shaft 20a the degree of stretch or elongation imposed upon each of the bars 12 during each one-half revolution will be correspondingly decreased or increased as the case may be.

Adjustment of the angular position of the blocks 22a with respect to the shaft 20a by means of the set screws 92 and 93, as just described, cannot be accomplished while the roll is rotating, and therefore travel of the web and the roll must be stopped in order to permit the necessary or desired adjustment to be made. However, in many web handling and processing installations it may be costly and impractical to shut down the operation in order to adjust the angular position of the blocks 22a to vary the degree of elongation and contraction of the bar elements 12 as desired, and in such installations provision should be made to enable such an adjustment to be made while the roll 10 is rotating and without interrupting travel of the web.

Referring to FIGS. 13–20 of the drawings, there is shown a novel construction and arrangement of spreader roll having mechanism operable at will to adjust the angular positions of the annular bar carriages with respect to the shaft and thereby vary the degree of stretch imparted to the aforementioned elastic bars, while the roll is in motion. Further, this construction lends itself to installations wherein a monitoring system would be used in conjunction with the travelling web and mechanical means responsive to said monitoring means for automatically adjusting the degree of elongation of the bars according to varying conditions in the web travelling thereover. Such systems are presently available in varied forms and consequently are not illustrated in the accompanying drawings, since application of such systems will be obvious to anyone skilled in the art.

Figure 13:
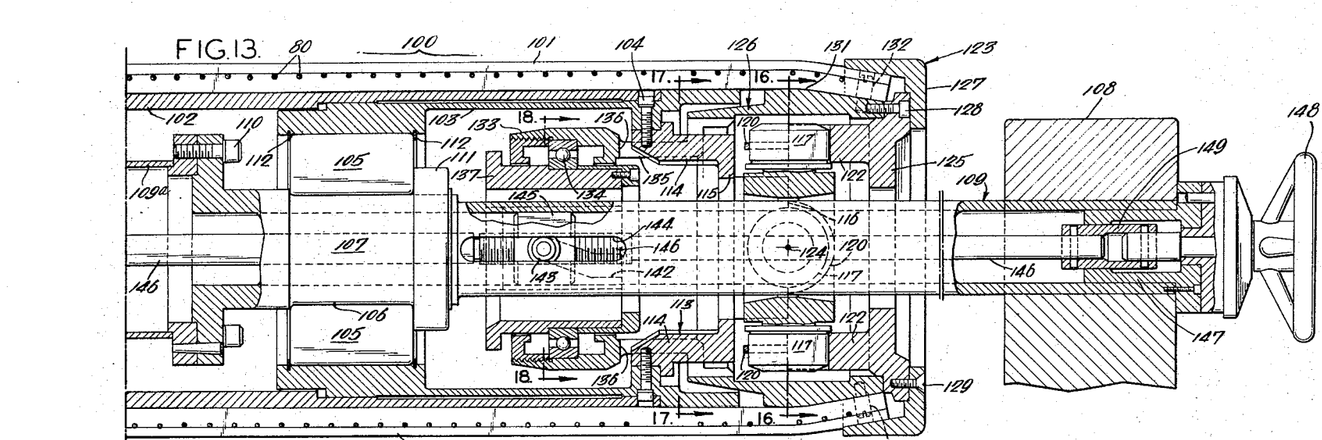
FIGS. 13 and 14 comprise longitudinal sectional views respectively of a further modified form of spreader roll.
Figure 14:
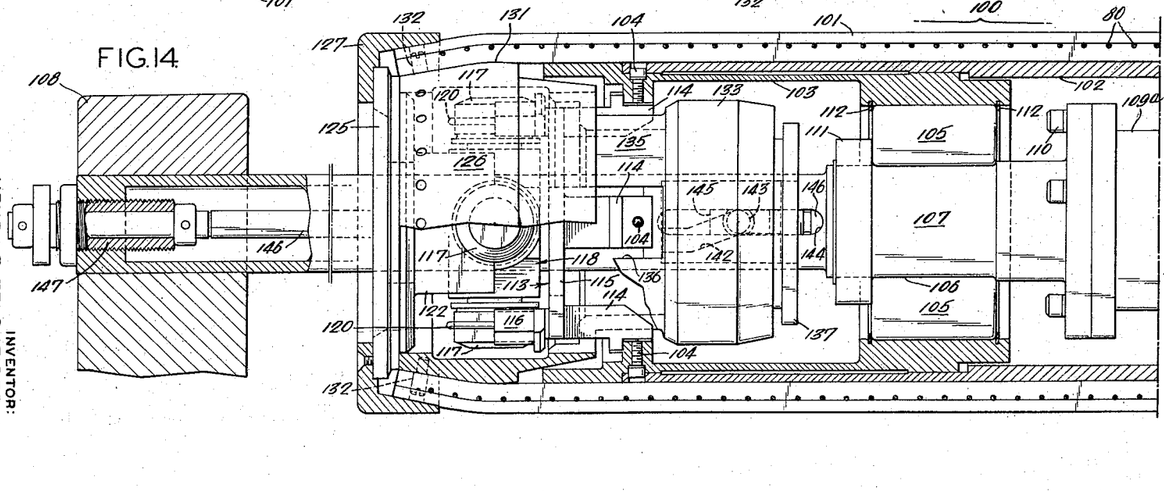

With reference more particularly to the drawings, FIGS. 13 and 14 show a longitudinal sectional view through a modified spreader roll having adjusting mechanism of the type referred to. Since certain elements of the roll are similar in structure and have been identified and described in connection with the previous forms of rolls, the following description will be directed to the modified elements specifically.

The spreader roll 100 carrying the elastic bars 101, 101 similarly mounted and secured thereto as described in the previously mentioned forms, comprises essentially a centrally disposed cylindrical section 102 which is secured at its opposite ends to cylindrical extensions 103, 103 by means of fasteners 104, 104. It will be noted that the section 102 and sleeves 103, 103 comprise a cylindrical sleeve assembly for support of the elastic bars 101 in the manner previously described.

The innermost end of each extension 103 constitutes a race ring for radial thrust roller bearing elements 105, 105, while support for the rollers is provided by raceways 106, 106 formed on roll supporting arbor 107 which in turn is fixedly secured in frame supports 108, 108. The roll 100 is thus mounted for free rotational movement on the fixed arbor 107.

For expediency of manufacture, the arbor is multi-sectional, having end sections 109, 109 and an intermediate connecting member 109a. The sections are joined by fasteners 110, 110. Each of the end sections 109, 109 is shouldered as at 111, 111 to accommodate the bearing elements 105, 105. Split retaining rings 112, 112 position the roll 100 with respect to anti-friction rollers 105, 105 and the arbor 107. The roll section 102 and associated sleeve members 103, 103 are joined at their outermost ends by end caps 113, 113 which are secured to the roll cylinder by the aforementioned fasteners 104, 104 thereby becoming an integrated part thereof.

Since the roll structure at opposite ends thereof is identical a description of one will suffice, duplicate reference characters being used to identify similar parts. Each end cap has a segmented hub portion 114 (see FIGS. 13, 17 and 20) extending axially of the arbor 107 and vertically disposed cylindrical flange portion 115. Projecting outwardly from the face of flange 115 is a pair of diametrically opposed semi-circular saddles 116, 116 having bearing surfaces arranged to receive a corresponding pair of rollers 117, 117 carried on a ring-like knuckle 118 which surrounds the fixed arbor 107. The rollers 117, 117, four in number, are equally spaced apart and carried on trunnions 119, 119 which extend outwardly from the body of the knuckle. Anti-friction needle bearings 117a (FIG. 15) are positioned therebetween. Flanges 121 on the rollers hold the rollers captive in their respective saddle seats by engagement with the inner edge thereof. U-shaped straps 120, 120 in saddles 122, 122 embrace the elements 117, 117 to insure nesting relationship therewith.

Figure 15:
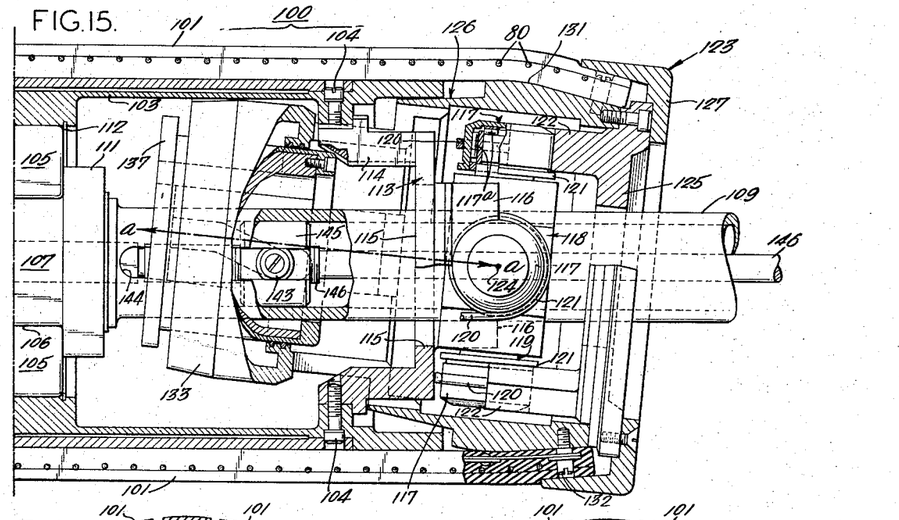
FIG. 15 is a fragmentary section of one end of the roll at a larger scale showing certain of the parts adjusted to a different position.
Figure 16:
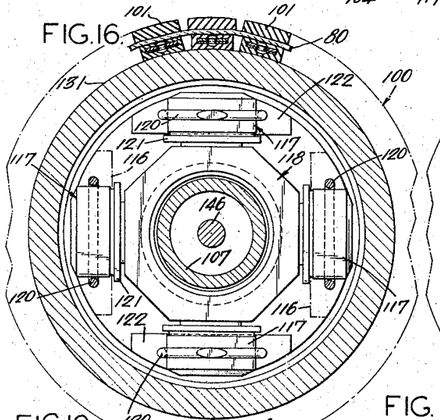
FIG. 16 is a transverse section as viewed from line 16—16, FIG. 13.
Figure 17:
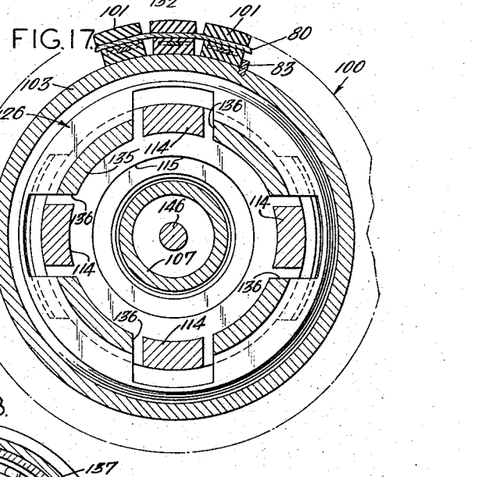
FIG. 17 is a similar view as viewed from line 17—17, FIG. 13.

The other pair of rollers 117, 117 of knucle 118 are similarly seated in opposing saddle bearings 122, 122 which are carried on the inner face of stretch bar carriage 123. In effect then, the structure described constitutes a universal joint, one end of which—end cap 113—remains in constant axial alignment with the arbor 107 while the carriage 123 through knuckle 118 is permitted to adjust from a position of axial alignment with the arbor, to one wherein such adjustment about the axis of the rollers 117, 117 tilts the carriage as illustrated in FIG. 15 to effect elongation of the stretch bars 101, 101. It should be noted that as a result of this tilt, the carriage 123 rotates as an integral part of the roll structure, but about its new axis a—a as indicated in FIG. 15, one end of the axis being centered in the knuckle 118 as at 124.

The carriage 123 is comprised of a hub-like member 125, a tubular extension thereof 126, and an end cap 127. Fasteners 128 and 129 integrate the assembly. The extension 126 is characterized by a spherical surface 131 of equal diameter to the roll cylinder 102, said surface having its point of generation in the knuckle axis at 124. The stretch bars 101, 101 are secured in the carriage 123 similarly as described previously by anchor pins 132, 132 and end cap 127. At its inner end the member 126 terminates in a cylindrical housing 133 in which is secured the race ring of an anti-friction bearing 134. The opposite ends of the carriage 123 are joined by a cylindrical mid-section 135 which is apertured as at 136, 136 to permit passage therethrough of the segmented flange extensions 114, 114 of the roll end cap 113 (see FIGS. 15 and 17). There are four such flange extensions 114 in the present instance, received into four aligned apertures 136. Clearance therebetween is provided and relative axial displacement of each maintained through common interengagement with knuckle 118. Axial thrust imposed by the pretensioned elastic bars 101, 101 upon end cap 25 is taken by the rollers 117 of knuckle 118 to maintain the rollers in their seats in the respective saddle bearings 116, 116 and 122, 122.

The raceway of bearing 134 is secured in a sleeve 137 which surrounds the arbor 107, said sleeve providing bearing support for the terminal end of the carriage 123. The sleeve like the arbor does not rotate but may be axially displaced by means presently to be described. Such displacement thereof while adjusting the axis of the carriage 123 does not interfere with its rotation by reason of the bearing interconnection 134.

Figure 18:
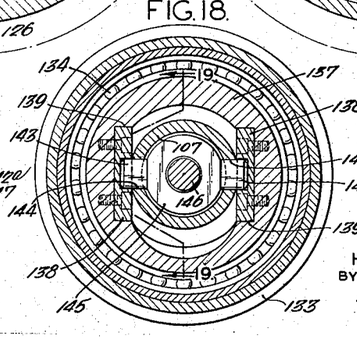
FIG. 18 is also a transverse section as viewed from line 18—18, FIG. 13.
Figure 19:
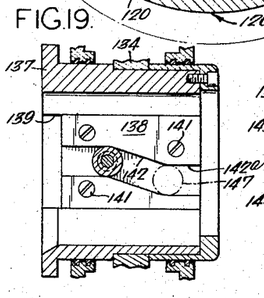
FIG. 19 is a fragmentary longitudinal section as viewed from line 19—19, FIG. 18.
Figure 20:
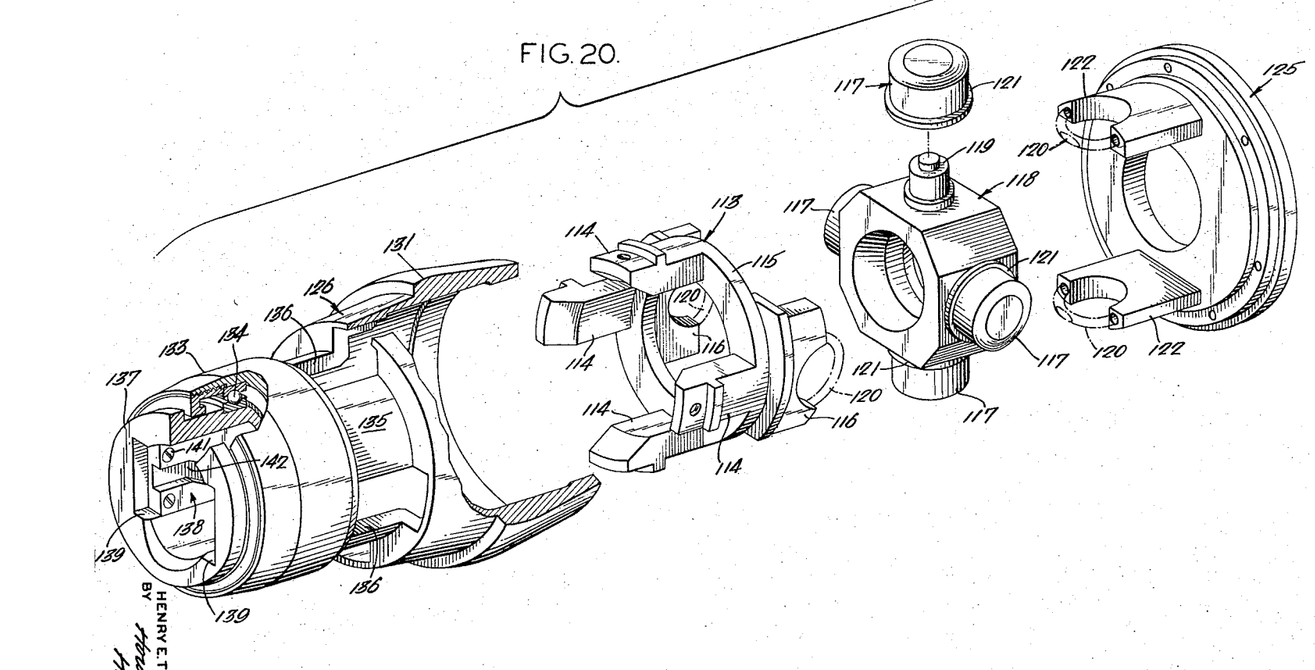
FIG. 20 is a view in perspective of certain of the roll components.

While particular reference to FIGS. 18 and 19 is made, the sleeve 137 is shown as mounting on its inner surface, a pair of cam plates 138, 138 oppositely positioned with respect to the axis of the arbor 107. The plates are secured in recesses 139, 139 by screws 141, 141. Longitudinally extending cam tracks 142, 142 in each of the plates are engaged by a pair of cam actuators 143, 143 which extend outwardly through a pair of oppositely disposed slotted openings 144, 144 in the arbor 107, said openings extending axially of the arbor and serving as guides for the actuators 143, 143. Said actuators may be in the form of trunnions secured to an internally threaded bushing 145 slidably positioned within the arbor on a threaded shaft 146. From the foregoing it will be obvious that longitudinal displacement of the bushing 145 within the arbor 107 traverses the trunnions 143, 143 within the slotted openings 144, 144 effecting relative movement between the trunnions and associated cam tracks 142, 142.

The cam tracks are so formed that in the full line showing of FIG. 19 the sleeve 137 is in axial alignment with the arbor 107 (see FIGS. 13–14). When the actuators 143, 143 are traversed a sufficient distance such as indicated at 147 in FIG. 19, the carriage 123 will have been adjusted to a position of maximum tilt and that part of the cam slot 142 designated 142a in FIG. 19 will be in the plane of the axis a—a shown in FIG. 15. In this position maximum stretch of the stretch bars 101, 101 will be attained. It will be obvious that intermediate positions therebetween will vary the degree of tilt of the carriage accordingly with a resulting corresponding degree of stretch to the bars 101, 101.

With reference to FIGS. 13 and 14, the threaded shaft 146 for traversing the bushings 145, 145 and thus adjusting the tilt angle of the respective carriages 123, 123, is supported for rotative movement in end bearings 147, 147 secured in opposite ends of the arbor 107, such movement effected by handwheel 148 operatively connected thereto by shaft coupling 149. It will be understood, of course, that those portions of the rod 146 which are in threaded engagement with the bushings 145, 145 of the respective carriages 123, 123 are oppositely threaded so that adjustment by the handwheel 148 to vary the tilt angle of the carriages occurs simultaneously and to the same degree in each.

From the foregoing it will be apparent that a spreader roll is provided (FIGS. 13 through 20) which is adjustable to varying degrees of stretch of the elastic bars while the roll is in motion simply by actuation of the handwheel 148 which operates to adjust the axis a—a of the carriages 123, 123 relative to the fixed axis of the roll supporting arbor 107. The range of adjustability, and consequently degree of stretch imparted to a web travelling thereover, ranging from zero—wherein the axis a—a of the respective carriages lie in a plane common to the axis of the arbor 107 (see FIGS. 13 and 14) to a degree of maximum stretch as shown in FIG. 15 wherein the angle between the axes of said carriages and arbor 107 is prescribed only by the structural limitations of the device.

Figure 21:
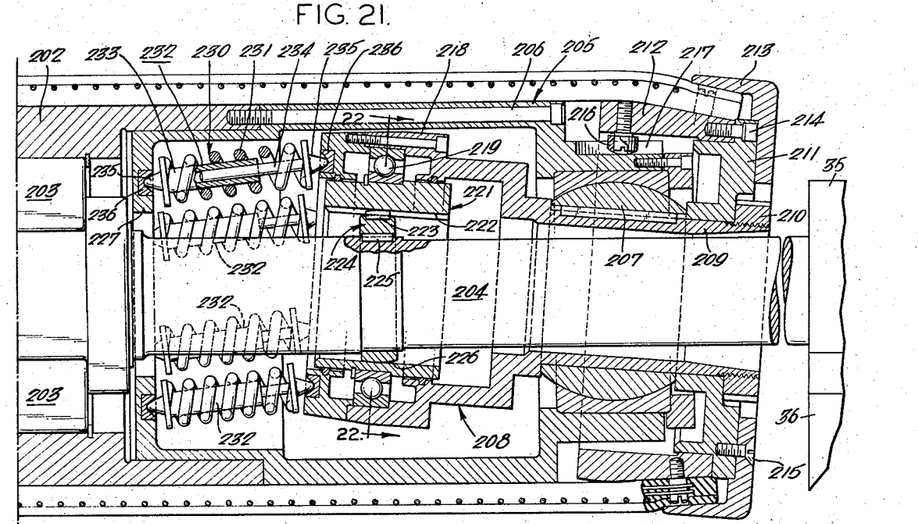
FIG. 21 is a view similar to FIG. 15 but illustrating a still further modification.
Figures 22, 23, 24, 25, 26:
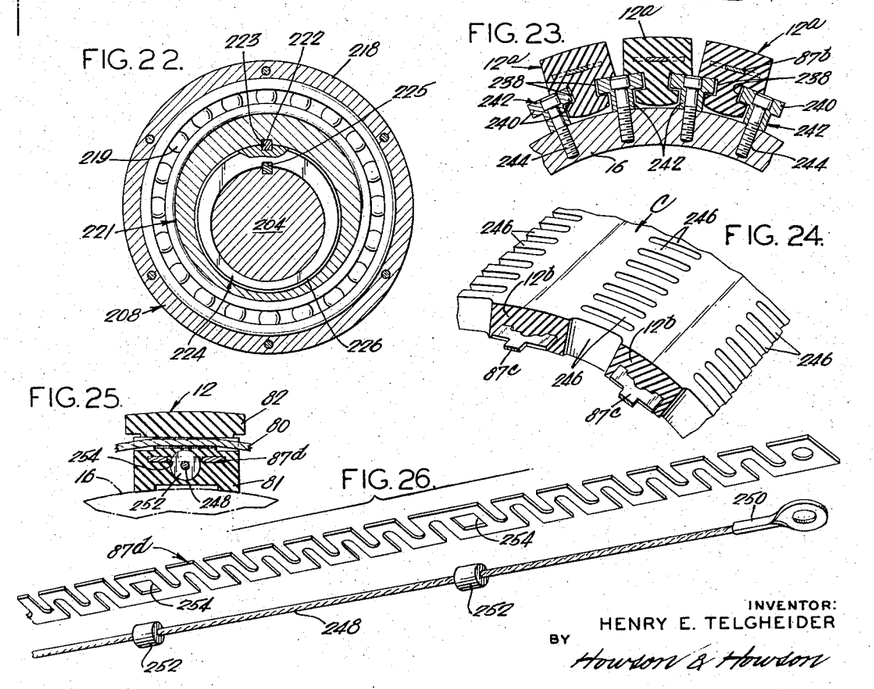
FIG. 22 is a transverse section taken on line 22—22, FIG. 21.
FIG. 23 shows a modified form of stretch bar and method of attaching same to the cylinder.
FIG. 24 illustrates a still further form of roll clothing utilizing principles of the present invention.
FIG. 25 is a transverse sectional view through an elastic bar element showing a modified construction and arrangement of the spring member therein.
FIG. 26 is a fragmentary view in perspective of the modified spring element and associated expansion control cable.

FIGS. 21 and 22 show still another modification of spreader roll having the basic characteristics of the previously described forms, but differing in that the axial thrust component exerted by the elastic bars upon their respective carriages is opposed and substantially balanced by the thrust component exerted by a captive compression spring assembly acting against the inner face of each of the carriages.

Referring to FIGS. 21 and 22, the main or central section 202 of the roll is rotatively supported on the fixed arbor 204 by means of roller bearings 203. The section 202 carries at opposite ends thereof sleeve extensions 205, 205 secured thereto by through bolts 206. Secured in the outer end of each of the sleeves 205 is a spherical bearing 207 which in turn mounts stretch bar carriage 208. A shouldered extension 209 thereof with lock nut 210 has secured at its outer end a hub-like member 211, rim 212, and clamping ring 213. Screws 214 and 215 integrate the end structure.

A roller 216 secured to the rim 212 and held captive in slot 217 of the sleeve 205 constitutes a driving connection between the sleeve and rim. The carriage 208 is thus driven rotationally by the roll body in unison therewith despite relative axial displacement with the axis of the arbor 204.

At its opposite end the carriage 208 has a bell shaped housing 218 as in the form of the previous showing (FIGS. 13 and 14) and similarly carries an anti-friction bearing 219 mounting a sleeve 221 which encircles the arbor 204. The sleeve is slotted longitudinally as at 222 for reception of a key 223. A ring 224 carrying the key is fitted to a shouldered portion of the arbor 204, the ring in turn being secured against relative rotation therewith by means of a key 225. The periphery 226 of the ring 224 is spherically configured, and is fitted to the inner bore of the sleeve 221. Also, it will be noted by reference to FIG. 22 that its outer surface 226 is eccentric to the axis of the arbor 204.

The arrangement is such that the sleeve 221 by reason of its keyed connection with the ring 224, and the ring in turn with the arbor 204, is immobilized against relative movement therewith, but allows the carriage 208 free rotation with the roll body through supporting bearings 219. It will be clear from the foregoing that the degree of tilt of the carriage, consequently the degree of stretch imparted to the elastic bars, is determined by the degree of eccentricity of the ring 224 with respect to the arbor 204.

Between the outer face of the housing 218 of the carriage and a flanged extension 227 of sleeve 205 is a spring assembly 230 which functions to exert a counter-thrust axially in opposition to that exerted upon the carriage 208 by the elastic bars and thus eliminate to a great extent excessive wear upon the bearings supporting the carriages in the roll structure. The spring assembly 230 comprises a plurality of springs 231 each individually supported on telescopic members 232, 232 having a flanged bushing 233 slidably fitted with a pin 234 having a flanged outer end. The flanges of each have conically shaped pin bearings 235, 235 extending outwardly axially thereof which serve to position the members 232, 232 in and between the opposing faces of the inner wall 227 of the sleeve and the end face of the carriage 208. Hardened inserts 236, 236 circumferentially spaced in each serve as sockets for reception of the pin bearings 235, 235.

It will be clear from the foregoing that the compression spring assembly 230 rotates unitarily about the fixed arbor 204 with the sleeve and carriage and that each of the several springs 231 adjusts automatically to the varying distances between their respective bearing seats while constantly exerting a counter-thrust as they move in an orbital path about the axis of the arbor. In the modification shown in FIGS. 21 and 22 the axis of rotation of the carriages is fixed. It will be understood, however, that the use of springs to balance the thrust components on the carriage is not limited to a roll of this type, but may be applied to the roll 100 of FIGS. 13 and 14 in which the axes of rotation of the carriages are adjustable. With reference to FIG. 21, one end of the modified roll structure is illustrated and it will be understood that a like structure is also incorporated in the opposite end of the roll.

A modified construction and arrangement of the elastic bar elements and means for retaining them in predetermined relation on the surface of the sleeve 16 is shown in FIG. 23 of the drawings. In the embodiment illustrated, each of the elastic bar elements 12a is of unitary one-piece construction having a spring 87b embedded therein as previously described. Each of the bar elements 12a is provided along its opposite sides adjacent the inner face thereof with inwardly offset outwardly facing grooves 238 which receive therein the projecting flange portions 240 of generally T-shaped rail members 242 that extend lengthwise of the outer surface of the sleeve 16 and are secured thereto by bolts 244. As shown in FIG. 23, the relative dimensions of the grooves 238 and flanges 240 of the rail members 242 are such as to provide sufficient clearance therebetween to permit independent elongation and contraction of the bar elements 12a relative to one another and to the sleeve 16 with relative freedom and a minimum of frictional resistance. It will be apparent that in this construction and arrangement of the bar elements and retaining rails 242 the use of a retaining cord such as 80 or a like member is unnecessary.

FIG. 24 of the drawings shows a still further modified construction of the elastic bar elements wherein the bar elements 12b are formed as an integral part of a unitary one-piece covering or clothing C for the roll sleeve 16. As shown in the drawings, each of the elastic bar portions 12b of the cover C has embedded therein a spring 87c as previously described. The several elastic bar portions 12b are relatively spaced circumferentially with respect to each other and are joined together along their respective opposite side portions by a series of relatively thin longitudinally spaced circumferential web portions 246 which form an integral part of the one-piece cover member C. In view of the one-piece construction of the roll cover C the use of independent retaining means such as a cord member 80 or rail members 242 are not necessary and the web portions 246 of the cover which interconnect the relatively circumferentially spaced elastic bar portions 12b thereof have a high degree of flexibility and elasticity so that the bar portions 12b elongate and contract substantially independently relative to one another and to the sleeve 16 and with a minimum of frictional resistance from the latter.

In heavy duty installations it may be necessary or desirable to augment action of the spring in the elastic bar elements with means to further insure the distribution of the expansion and elongation of the spring member uniformly lengthwise thereof. One arrangement for accomplishing this purpose is shown in FIGS. 25 and 26 of the drawings wherein a spring member 87d is embedded in the base portion 81 of the elastic bar element 12 in a manner and arrangement similar to that previously described herein. Also embedded in the base portion 81 and underlying the spring 87d is a cable member 248. The cable 248 extends entirely lengthwise of the spring 87d and suitable means 250 are provided at opposite ends of the cable for anchoring the same to the opposite ends of the spring 87d and the annular carriages 18. Secured at equally spaced intervals along the cable 248 are lugs 252 each of which is engaged within an opening 254 provided in the spring 87d at locations therealong corresponding to the spacing of the lugs 252 on the cable 248. The cable and the lugs thereon interlocked with the spring 87d function to predeterminedly limit the expansion and elongation of the spring 87d in each section or portion thereof between adjacent lugs 252 and thereby insure distribution of the spring expansion or elongation equally and uniformly in the several sections or portions of the spring 87d lengthwise thereof.

It will be apparent from the foregoing that the present invention provides a novel construction and arrangement of spreader roll having the characteristics and features set forth, and while certain embodiments of the invention have been shown and described, it is not intended to limit the invention to the disclosed embodiments, but that changes and modifications may be made and incorporated within the scope of the claims.

I claim:

1. A spreader roll comprising means defining a cylindrical supporting surface, means mounting said cylindrical supporting surface for rotation about the longitudinal axis thereof, a plurality of elongated elastic elements extending longitudinally on the cylindrical supporting surface in spaced parallel relation circumferentially thereabout, drive members connected respectively to the opposite ends of each of said elastic elements, means mounting said drive members for rotation about axes angularly disposed with respect to each other and lying in a plane containing the axis of said cylindrical supporting surface thereby causing each of said elastic elements successively to be progressively longitudinally elongated and contracted during each revolution of said drive members, means interconnecting adjacent elastic elements at intervals throughout their length opposing centrifugal forces tending to displace said elements from the supporting surface and being flexible in a direction longitudinally of the elastic elements to provide substantially free independent longitudinal elongation and contraction of the elastic elements relative to one another and the supporting surface, and a spring member embedded in and extending longitudinally throughout the length of each elastic element with its opposite ends anchored respectively to said drive members and operable to distribute elongation and contraction of each element uniformly therealong.

2. A spreader roll as claimed in claim 1 wherein a key member is inserted between a single selected pair of adjacent elastic elements and engaged in a longitudinally keyway in the supporting surface to prevent creeping of all of the elastic elements in a direction circumferentially of said surface.

3. A spreader roll as claimed in claim 1 wherein each of the elastic elements comprises a base portion extending longitudinally on the cylindrical supporting surface, an outer cap portion permanently bonded to the outer surface of said base portion, and the means interconnecting the adjacent elastic elements is a cord-like member extending circumferentially of the supporting surface and engaging said elastic elements intermediate the base and outer cap portions thereof.

4. A spreader roll as claimed in claim 3 wherein the outer face of the base portion of each elastic element is provided with a plurality of transverse grooves therein at spaced intervals therealong, and the cord-like member extending circumferentially of the supporting surface engages within said transverse grooves in the base portions of the elastic elements.

5. A spreader roll as claimed in claim 3 wherein the spring member is embedded in the base portion of each elastic element extending longitudinally therein and has its opposite ends securely anchored respectively to the drive members.

6. A spreader roll as claimed in claim 3 wherein the cord-like member is bonded to each of the plurality of elongated elastic elements at each area of engagement of said cord-like member with said elastic elements.

7. A spreader roll comprising means defining a cylindrical supporting surface, means mounting said cylindrical supporting surface for rotation about the longitudinal axis thereof, a plurality of elongated elastic elements extending longitudinally on the cylindrical supporting surface in spaced parallel relation circumferentially thereabout, drive members connected respectively to the opposite ends of each of said elastic elements, means mounting said drive members for rotation about axes angularly disposed with respect to each other and lying in a plane containing the axis of said cylindrical supporting surface thereby causing each of said elastic elements successively to be progressively longitudinally elongated and contracted during each revolution of said drive members, and a spring member embedded in and extending longitudinally throughout the extent of each elasttic element with its opposite ends anchored respectively to said drive members and operable to distribute elongation and contraction of each element uniformly therealong.

8. A spreader roll as claimed in claim 7 wherein the drive members comprise a pair of annular carriages mounted on blocks pivotally mounted on pins extending crosswise of the rotational axis of the supporting surface, and means is provided to adjust the angular position of the blocks and carriages thereon to thereby vary the extent to which the elastic elements are elongated and contracted by rotation of said annular carriages.

9. A spreader roll as claimed in claim 7 wherein the drive members comprise a pair of annular carriages, and means is provided to adjust the rotational axes of the carriages comprising a rod extending coaxially inwardly of an end of the cylindrical surface, means actuated by rotation of said rod and engaging cam means to actuate the same and effect angular displacement of the annular carriages relative to the cylindrical surface about an axis normal thereto, and a hand wheel rotatable at will to rotate the rod and adjust the position of the carriages while the spreader roll is rotating.

References Cited

UNITED STATES PATENTS

| | | |
|---|---|---|
| 1,569,536 | 1/1926 | Crysler. |
| 1,997,442 | 4/1935 | Walsh _________ 26—63 |
| 2,158,631 | 5/1939 | Mettler _________ 26—63 |
| 2,436,719 | 2/1948 | Hurxthal. |
| 2,978,740 | 4/1961 | Maier _________ 26—64 X |
| 2,982,667 | 5/1961 | Ness et al. _________ 26—54 X |
| 3,060,545 | 10/1962 | Thiel et al. _________ 26—63 |

FOREIGN PATENTS

| | | |
|---|---|---|
| 432,933 | 10/1911 | France. |
| 1,064,839 | 12/1953 | France. |
| 944,939 | 6/1956 | Germany. |

ROBERT R. MACKEY, *Primary Examiner.*